United States Patent Office 2,968,451
Patented Jan. 17, 1961

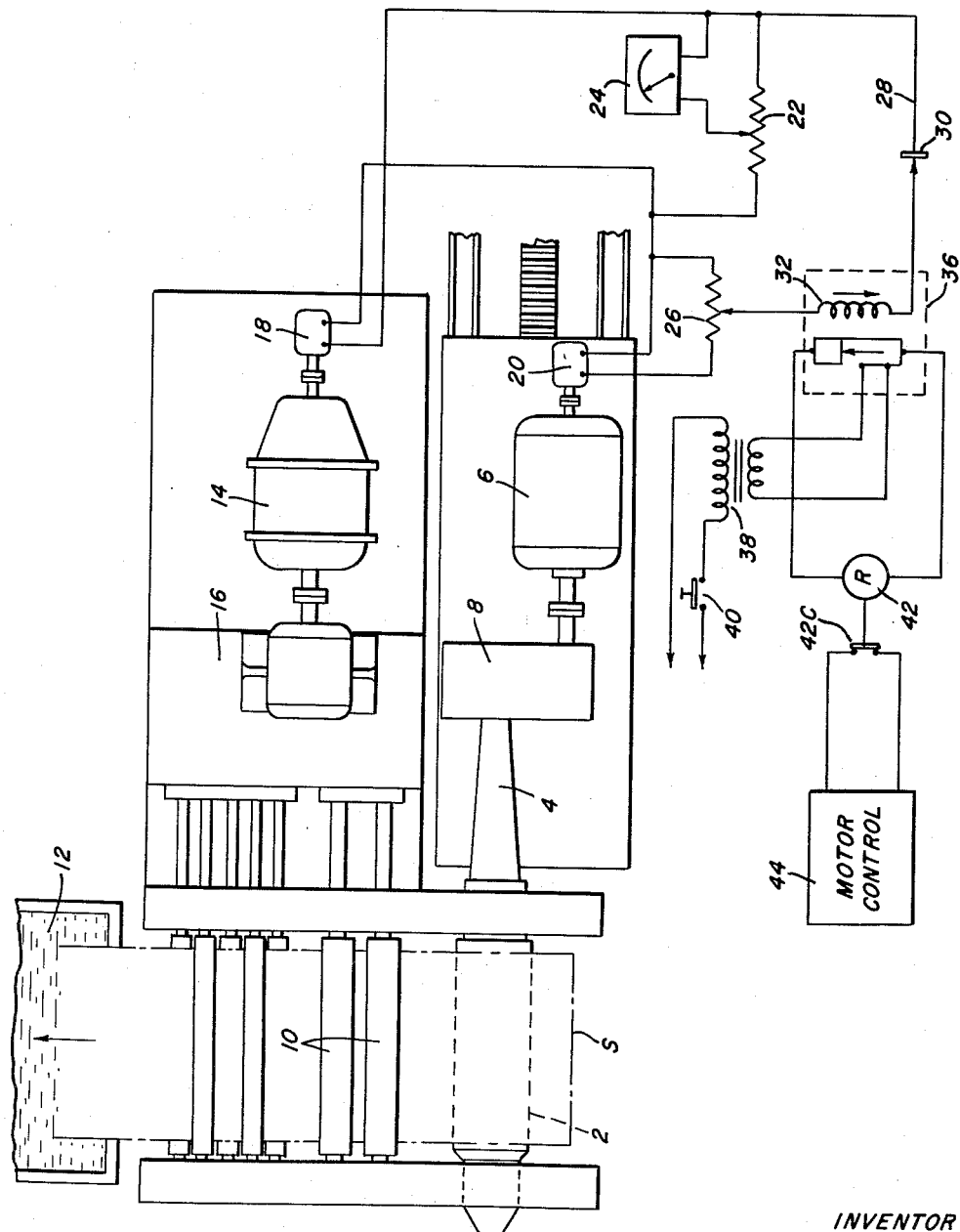

2,968,451

CONTROL FOR AN UNCOILER

Edward J. Schneider, Pittsburgh, Pa., assignor to United States Steel Corporation, a corporation of New Jersey Filed Mar. 28, 1958, Ser. No. 724,637

4 Claims. (Cl. 242—75.51)

This invention relates to a control for an uncoiler and more particularly to a control for slowing down the speed of a strip uncoiler when a predetermined short length of strip remains on the uncoiler. In the continuous processing of strip; such as in cleaning, pickling, annealing or coating line, the tail end of one coil of strip is passed from the uncoiler to a shear where the crop end is removed. The strip is then moved to a joining device where it is held until the next succeeding coil is stitched or welded thereto in the usual manner. Prior to my invention it was necessary for the operator to manually control the entry section of the processing line in order to move the tail end of the strip at a sufficiently slow speed to avoid damage to the rolls, guides, bearings, and the like by the flapping action of the strip. This required close supervision by the operator and if he started the slowdown too late damage to the equipment could occur while if he started it too soon there was loss of production.

It is therefore an object of my invention to provide a control for slowing down the speed of the strip automatically when a predetermined short length of strip remains on the uncoiler.

This and other objects will be more apparent after referring to the following specification and attached drawing, in which:

The single figure is a schematic view of the uncoiler and control thereof.

Referring more particularly to the drawings, reference numeral 2 indicates the mandrel of an uncoiler for supporting a coil of strip S. Shaft 4 of the uncoiler is connected to a drag generator 6 through a gear box 8. Pull out rolls 10 are located between the uncoiler 2 and feed the strip to processing equipment 12 which may be a pickling tank. Rolls 10 are driven from motor 14 through gear box 16. The equipment so far described is conventional. A tachometer generator 18 is connected to the shaft of motor 14 and a second tachometer generator 20 is connected to the shaft of drag generator 6. Thus, the generator 18 generates a voltage proportional to strip speed and generator 20 generates a voltage proportional to the angular velocity of the uncoiler 2. The output circuit of generator 18 includes an adjustable resistor 22. A line speed meter 24 is connected in circuit with the resistor 22. Calibration of the line speed meter 24 is provided by the resistor 22. The output circuit of generator 20 includes an adjustable resistor 26. The voltages generated by the generators 18 and 20 are compared by means of a circuit 28 which includes a blocking rectifier 30 and a control field 32 connected in series. The control field 32 is part of a magnetic amplifier 36 which rectifies A.C. power from a transformer 38 to give a low voltage D.C. output. A switch 40 may be provided in the primary circuit of transformer 38. The amplifier 36 is connected in series with a relay coil 42 having a contact 42C. Contact 42C is connected in control circuit 44 of motor 14. The relay 42 is a telephone type relay which is sensitive to voltage variations and functions with a fixed drop in voltage as determined by the current flow to coil 42.

The operation of my device is as follows:

In normal operation of the strip processing line, pull out rolls 10 pull strip S from the coil on uncoiler 2. As long as the coil diameter is materially larger than the diameter of the uncoiler mandrel the voltage generated by generator 18 will be larger than the voltage generated by generator 20. However, no current will flow because the rectifier 30 permits current passage in one direction only; that is, from generator 20 to generator 18. As the size of the coil decreases the angular velocity of shaft 4 must increase and hence the voltage generated by generator 20 will increase. During the final stages of the uncoiling, when only several coil wraps remain on the uncoiler 2, the voltage of generator 20 will overcome the voltage of generator 18 and a small current will start to flow to field 32. This control field is so connected that it tends to reduce the effective voltage being rectified in amplifier 36. As the voltage generated by generator 20 continues to increase the current flow through circuit 28 also increases and the voltage through coil 42 continues to decrease until its contacts 42C close, thereby energizing the slowdown circuit 44 to slow down the motor 14. The variable resistor 26 is provided to adjust the control for changes in strip gage, for setting the point at which it is desired to start slowdown of the line and for changes in inside diameter of strip coils. After the tail end of the strip is run out and an end of one coil attached to the leading end of the next succeeding coil the line is again placed in normal operating condition by the operator.

While one embodiment of my invention has been shown and described it will be apparent that other adaptations and modifications may be made without departing from the scope of the following claims.

I claim:

1. Apparatus for slowing down the speed at which material is pulled from an uncoiler comprising a device providing a drag on said uncoiler, a first means for pulling strip from the uncoiler, a second means for generating a voltage proportional to the linear speed of the material leaving the uncoiler, a third means for generating a voltage proportional to the angular velocity of the uncoiler, means for comparing the voltages generated by the second and third means, and means for slowing down the speed of said first means when the voltage generated by the third means exceeds the voltage generated by the second means by a predetermined amount, said last named means maintaining said first means at the slowed down speed until the strip on the uncoiler is exhausted.

2. Apparatus for slowing down the speed at which material is pulled from an uncoiler comprising a device providing a drag on said uncoiler, a first means for pulling strip from the uncoiler, a second means for generating a voltage proportional to the linear speed of the material leaving the uncoiler, a third means for generating a voltage proportional to the angular velocity of the uncoiler, a circuit for comparing the voltages generated by the second and third means, an amplifier having a control field, said control field being in said circuit, a rectifier in said circuit in series with said control field and permitting flow of current only in a direction from said third means to said second means, a second circuit including said amplifier and a relay coil connected in series, and means operable by said relay coil for slowing down the speed of said first means when the voltage generated by the third means exceeds the voltage generated by the second means by a predetermined amount, said last named means maintaining said first means at the slowed down speed until the strip on the uncoiler is exhausted.

3. Apparatus for slowing down the speed at which material is pulled from an uncoiler comprising a device providing a drag on said uncoiler, a motor for pulling strip from the uncoiler, a first tachometer generator connected to be driven at a speed proportional to the speed of said motor, a second tachometer generator connected to be driven at a speed proportional to the angular velocity of said uncoiler, means for comparing the voltage generated by said tachometer generators, and means for slowing down the speed of said motor when the voltages generated by said second generator exceeds the voltage generated by said first generator by a predetermined amount, said last named means maintaining said motor at the slowed down speed until the strip on the uncoiler is exhausted.

4. Apparatus for slowing down the speed at which material is pulled from an uncoiler comprising a device providing a drag on said uncoiler, a motor for pulling strip from the uncoiler, a first tachometer generator connected to be driven at a speed proportional to the speed of said motor, a second tachometer generator connected to be driven at a speed proportional to the angular velocity of said uncoiler, a circuit connecting the outputs of said generators, an amplifier having a control field, said control field being in said circuit, a rectifier in said circuit in series with said control field and permitting flow of current only in a direction from said second tachometer generator to said first tachometer generator, a second circuit including said amplifier and a relay coil connected in series, and a control circuit for said motor, said relay coil having a contact in said control circuit, said relay coil operating its contact to slow down the speed of said motor when the voltage generated by said second generator exceeds the voltage generated by said first generator by a predetermined amount, said motor being maintained at the slowed down speed until the strip on the uncoiler is exhausted.

References Cited in the file of this patent
UNITED STATES PATENTS 2,601,957   Halter _____ July 1, 1952

FOREIGN PATENTS 480,199   Canada _____ Jan. 15, 1952